United States Patent [19]
Reeder et al.

[11] 3,970,740
[45] July 20, 1976

[54] WET GAS SCRUBBING PROCESS

[75] Inventors: Perry E. Reeder, Baytown, Tex.;
Leonard M. Williams, Baton Rouge, La.

[73] Assignee: Exxon Research and Engineering Company, Linden, N.J.

[22] Filed: June 13, 1973

[21] Appl. No.: 369,771

[52] U.S. Cl. .............................. 423/242; 423/234; 423/215.5; 252/411 S
[51] Int. Cl.² ........................................ B01D 53/34
[58] Field of Search ........ 423/210, 234, 242, 215.5; 252/411 S; 261/DIG. 54

[56] References Cited
UNITED STATES PATENTS

| | | | |
|---|---|---|---|
| 2,113,198 | 4/1938 | Nonhebel | 423/242 |
| 2,684,231 | 7/1954 | Pomykala | 423/242 |
| 3,385,030 | 5/1968 | Letvin | 261/DIG. 54 |
| 3,632,305 | 1/1972 | Hardison | 423/215.5 |
| 3,755,990 | 9/1973 | Hardison | 261/DIG. 54 |

OTHER PUBLICATIONS

Asahara, "Double Alkali Systems for Control of Sulfur Oxide Pollution," Chemical Economy & Engineering Review, vol. 4, No. 12 (Dec. 1972), pp. 30–35.

Jones, "Development of the Venturi Scrubber," Industrial & Engineering Chemistry, vol. 41, No. 11, Nov. 1949, pp. 2424–2427.

*Primary Examiner*—Earl C. Thomas
*Attorney, Agent, or Firm*—Marthe L. Gibbons

[57] ABSTRACT

A process for removing catalyst fines and acidic gases from a fluid catalytic cracking process regenerator gaseous effluent by scrubbing the effluent with an aqueous scrubbing mixture maintained within a critical pH range in a jet ejector venturi scrubbing system.

24 Claims, 1 Drawing Figure

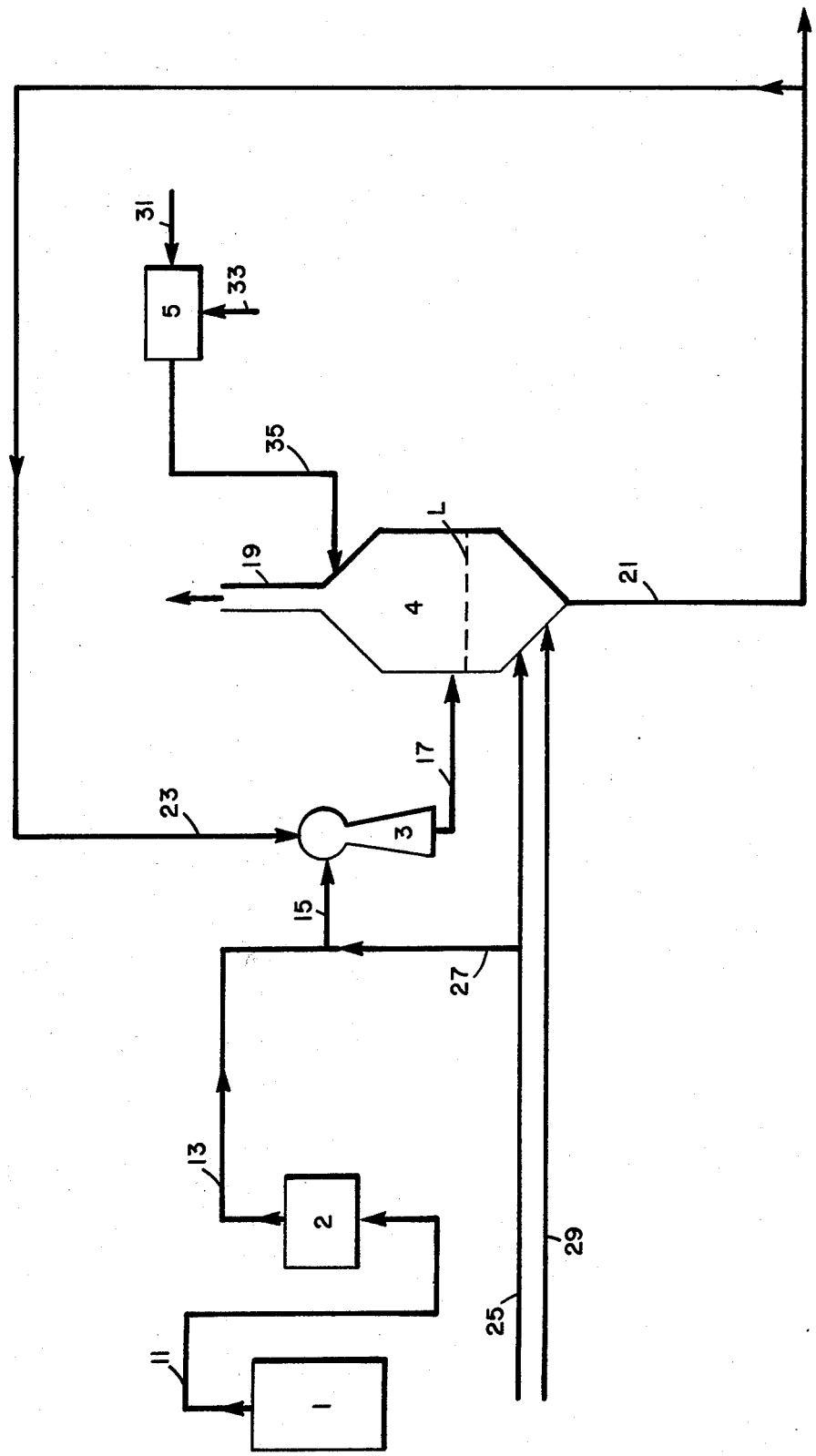

WET GAS SCRUBBING PROCESS

BACKGROUND OF THE INVENTION

1. Field of the Invention

This invention relates to a method for the removal of solid particulates and acidic gases from gaseous mixtures. It relates particularly to a method for the removal of solid particulates and acidic gases from gaseous mixtures produced in the process of regenerating catalysts employed in the catalytic cracking of hydrocarbons.

2. Description of the Prior Art

The gaseous mixture produced in the regenerator of fluid catalytic cracking process systems contains solid particulates, including catalyst fines, and acidic gases, such as, sulfur oxides. It is desirable to lower the level of solid particulates and acidic gases from such a gas before it is introduced into the atmosphere so as to minimize the detrimental effect of these pollutants to the ecology. It is known that solid particulates can be removed from gases by wet scrubbing methods including scrubbing gases in jet ejector type venturi scrubbers in which a scrubbing liquid, under pressure, enters the venturi through a spray nozzle. The velocity of the liquid spray creates a draft in a chamber of the venturi scrubber and causes gases or vapors to be drawn into the scrubber body and through a constricted passage of the scrubber wherein intimate mixing of scrubbing liquid and gas occurs. Generally, the effluent of the scrubber (which may be one or more venturi structures in series or in parallel) is passed to a separator in which the contaminated liquid is separated from the cleaned gas. It is also known that acidic or basic materials may be added to the scrubbing liquid to neutralize or absorb basic or acidic contaminants that may be present in the gas subjected to the wet scrubbing treatment.

Although many types of venturi wet gas scrubbing systems have been proposed to reduce the level of particulates and acidic gases from gaseous mixtures prior to their discharge to the atmosphere, it has been found that the suitability of any specific wet scrubbing system for the efficient removal of solid particulates and other contaminants from gaseous mixtures cannot be predicted. Furthermore, it has been found that data obtained with one gas composition are not necessarily applicable to other gas compositions. Thus, the nature of the carrier gas, the nature and size of the solid particulate contaminants and the nature of the pollutant gas are factors which will affect the operability and efficiency of removal of contaminants by any of the known venturi wet gas scrubbing methods.

It has now been found that solid particulates, including cracking catalyst fines, condensable contaminants and acidic gases, such as, sulfur oxides, can be reduced to an appropriate level in the gaseous mixture that has been produced in the regenerator unit of a fluid catalytic cracking system by a wet gas scrubbing process carried out under specified conditions, utilizing a jet ejector type of venturi scrubber.

SUMMARY OF THE INVENTION

In accordance with the invention, there is provided a process for removing acidic gases and solid particulates from a gaseous effluent containing the same, which comprises contacting the gaseous effluent with water to produce a water-saturated gas; introducing the water-saturated gas into a venturi structure and contacting the same with a relatively colder, high velocity stream of an aqueous scrubbing mixture containing a basic material, said scrubbing mixture being maintained at a pH in the range varying from about 6 to about 7; passing the admixture of said gas and scrubbing mixture through a constricted passage of said venturi structure to increase the velocity thereof; recovering the resulting admixture from the venturi structure and separating the recovered admixture into a liquid portion and a gaseous portion having a reduced content of solid particulates and acidic gases. If desired, this gaseous portion may be reheated above its dew point prior to discharging it to the atmosphere.

In one embodiment of the invention, a portion of the liquid resulting from the separation step is recycled to the venturi structure as scrubbing mixture.

BRIEF DESCRIPTION OF THE DRAWING

The FIGURE is a diagrammatic flow plan of one embodiment of the invention.

PREFERRED EMBODIMENT OF THE INVENTION

The preferred embodiment of the invention will be described with reference to the accompanying FIGURE.

The process of the invention is suitable for removing solid particulates and acidic gases from gaseous effluents of refinery processes, especially low pressure gaseous effluents. The process of the invention is particularly suitable for removing solid particulates and acidic gases from a gaseous mixture produced in the regenerator of a catalytic cracking process. It is especially suited for the treatment of gaseous mixtures produced in the regenerator of fluid catalytic cracking process units. Fluid catalytic cracking processes are well known (see, for example, Hydrocarbon Processing, September 1972, pp. 131–138). During the cracking reaction, carbonaceous material deposits on the catalyst particles and thereby lowers their catalytic activity. It is, therefore, the usual procedure to circulate a stream of partially deactivated catalyst particles from the catalytic reaction zone to a regeneration zone where the carbonaceous deposit is burned from the catalytic particles by combustion in the presence of an oxygen-containing gas, such as air. The regeneration may be conducted at a temperature within the range of 800° to 1500°F. When the regeneration is conducted in the lower temperature range, that is, between about 800°–1300°F., the regenerator gaseous effluent will contain about 8 to 14 mole % carbon monoxide (on a dry basis). When it is desired to lower the CO content of this gas, it is the conventional practice to pass the gas to a combustion zone, such as, a CO boiler or furnace and thereby convert at least a portion of the CO to $CO_2$. When the regeneration process has been conducted in the higher temperature range, that is, in the range varying from abut 1300° to 1500°F., the regenerator gaseous effluent will contain only about zero to 12 mole % CO since a portion of the initially formed CO is converted to $CO_2$ in the high temperature regeneration. In the latter case, the regenerator gas is usually not passed through a CO boiler or furnace. In many known processes, the catalytic regeneration is conducted at low pressures, for example, below about 30 pounds per square inch gauge (psig). The outlet pressure of the gaseous effluent of such a low pressure regenerator will therefore also be low. Furthermore, when a regenerator gas is burned in a combustion vessel such as a CO boiler or furnace, the gases exiting from the combustion vessel will have low pressures, typically, in the range of about −0.1 to 1.0 psig.

The gas cleaning process of the present invention is applicable to fluid catalytic cracking regenerator gas obtained in low or high temperature regeneration processes and which may, optionally, subsequently have been burned in a combustion zone prior to subjecting the gas to the wet scrubbing treatment.

Typical compositions of the regenerator effluent gas and regenerator gas which subsequently has been burned in a CO boiler are as follows:

| Regenerator Gas Emanating from a CO Boiler | |
|---|---|
| Constituents | Amount |
| Nitrogen | 65 to 75 mol % |
| Oxygen | 1 to 5 mol % |
| Carbon Dioxide | 10 to 15 mol % |
| Water Vapor | 10 to 25 mol % |
| Sulfur Oxides | 20 to 800 vppm |
| Nitrogen Oxides | 50 to 200 vppm |
| Solid Particulates | 0.02 to 1.0 grains/SCF |
| Regenerator Effluent | |
| Constituents | Amount |
| Nitrogen | 60 to 70 mol % |
| Oxygen | <0.5 mol % |
| Carbon Dioxide | 6 to 10 mol % |
| Carbon Monoxide | 6 to 10 mol % |
| Water Vapor | 10 to 30 mol % |
| Sulfur Oxides | 20 to 800 vppm |
| Nitrogen Oxides | 0 to 20 vppm |
| Solid Particulates | 0.04 to 1.2 grains/SCF |

Referring to the FIGURE, a gaseous effluent is removed from a fluid catalytic cracking regenerator 1 via line 11 and introduced into a CO boiler 2 where it is burned. The burned regenerator gas emanating from the CO boiler is at a pressure of about −0.05 psig (the pressure may range broadly between about −0.1 and 1.0 psig) and at a temperature of about 600°F. (The temperature may range from about 200° to 1000°F.). The gaseous effluent of the CO boiler comprises carbon dioxide, oxygen, sulfur dioxide, sulfur trioxide, nitrogen, condensable materials, and solid particulates, which are mostly catalyst fines of the cracking catalyst utilized during the fluid catalytic cracking process. The usual catalysts utilized for cracking comprise siliceous materials, such as, silica; amorphous or crystalline (zeolites) silica-alumina; silica-zirconia; silica-magnesia, etc. From about 1 to 40 wt. % of the catalyst particles in the gaseous effluent are under one micron in size. Condensable materials are any of the constituents of the gaseous effluent (excluding water vapor) that would condense out of the gaseous effluent as a solid or as a liquid under standard conditions of temperature and pressure, for example, inorganic materials, such as, sulfate salts, and $H_2SO_4$, as well as, organic materials of hydrocarbonaceous nature. The gaseous CO boiler effluent is removed via line 13 and sprayed with water introduced via line 27 to saturate the gaseous mixture at its dew point. Water saturating the gas prior to introducing it into a venturi scrubber will prevent the vaporization of the scrubbing solution upon contact with a hot, water-unsaturated gas, as is known in the art, and will also serve to cool the gas. The water-saturated gas, which is now at a temperature of about 155°F. (suitable temperature of incoming water-saturated gas may range between 120° and 210°F.), is introduced into a venturi scrubber 3, without any intermediate compression between the CO boiler and the venturi scrubber, via line 15 where it will contact a stream of an aqueous scrubbing mixture conducted in line 23 and sprayed into venturi scrubber 3. The water-saturated gas is introduced into the venturi scrubber at a velocity of about 20 to 80 feet per second, preferably about 40 to 50 feet per second. The scrubbing mixture is introduced into the venturi scrubber at a ratio of 20 to 120 gallons of scrubbing mixture to 1000 cubic feet of gas, preferably at a ratio of 40 to 80 gallons of scrubbing mixture to 1000 cubic feet of gas. The scrubbing mixture is introduced into the venturi scrubber at a colder temperature than the temperature of the incoming water-saturated gas to aid in the desired entrapment of solid particles in the water. Desirably, the scrubbing mixture injected into the venturi scrubber is from about 5° to 50°F., preferably about 10°F. colder than the incoming water-saturated gas.

It is critical that the scrubbing mixture be maintained at a pH in the range of 6 to 7, preferably between about 6.5 and below 7. Precise control of the pH will determine the degree of sulfur oxides removed from the gas and will affect the operability of the system, particularly when it is conducted as a continued operation of a commercial unit. The pH must be maintained to be not higher than 7 to minimize the undesired absorption of $CO_2$.

To control the pH, a basic material is added to the aqueous scrubbing mixture. The basic material may be, for example, an alkali metal hydroxide, ammonia or ammonium hydroxide. In the preferred embodiment of the invention, sodium hydroxide is utilized as the basic material for pH control of the scrubbing mixture. Contact of the scrubbing mixture with the incoming gaseous mixture removes sulfur oxides from the gas by reaction with the basic material. The scrubbed gas and the scrubbing mixture flow through a constricted flow passage of the venturi scrubber whereby the velocity of the admixture of gas-scrubbing mixture is increased with consequent cooling and condensation of the water on the solid particles in a conventional manner. At least a portion of the total effluent of the venturi scrubber, that is, the mixture of gas and liquid is removed from the venturi scrubber via line 17 and introduced to a separator drum 4 above a level (indicated at L in the FIGURE) of any liquid that may be present in the bottom portion of separator drum 4. The pressure drop of the gas, between its exit pressure from the CO boiler and its outlet pressure from the separating vessel, must be kept at less than about 1 foot of water, preferably not greater than about 2 inches of water since the gas which enters the venturi scrubber is a low pressure gas. The process of the present invention eliminates the need for a gas compressor in the system to move the gas from the scrubber, through the separating vessel and up into a stack.

In the separator drum, the non-condensable gaseous portion of the venturi scrubber effluent flows upwardly and is reheated above its dew point prior to discharge it to the atmosphere via stack 19. Desirably, the reheating is carried out in such a way as to raise the temperature of the gaseous portion by about 5° to 75°F., preferably to raise its temperature by about 20°F., and may be accomplished by injecting a hot gas via line 35 into the upflowing stream of cleaned gas. The hot gas may be the effluent of a gas heater 5 into which are introduced a fuel gas via line 31 and air via line 33.

The contaminated liquid scrubbing mixture will form a liquid phase in the bottom portion (liquid hold-up zone) of the separator drum 4. It will contain suspended solids (catalysts) and dissolved solids, such as, sodium sulfates, sodium sulfites, ammonium sulfates, as well as, condensable liquid contaminants, such as $H_2SO_4$. Make-up water may be introduced into the liquid hold-up zone of the separator drum via line 25. Basic material, which in the preferred embodiment is sodium hydroxide of about 30° Be, may also be introduced via line 29 into the liquid hold-up zone of the separator drum to maintain the pH of the scrubbing mixture at the desired level. At least a portion of the liquid portion present in the separator drum is withdrawn via line 21. If desired, at least a portion of this liquid effluent, cooled to the desired temperature by conventional means, such as, a heat exchanger (not shown in the drawing), is recycled to the venturi scrubber 3 via line 23 as scrubbing mixture. Alternatively, make-up sodium hydroxide could be added to the recycle line instead of being introduced into the separator drum or in addition to being introduced into the separator drum. Another portion of the liquid effluent of the separator drum may be removed from the process and, if desired, subjected to further treatment, such as, concentration and removal of solids and treatment of the liquid waste to make it suitable for disposal. The following examples are presented to illustrate the process of the invention.

EXAMPLE 1

To determine the efficiency of the process of the invention for removal of catalytic cracking catalyst fines and condensable materials, such as, $H_2SO_4$ and $(NH_4)_2SO_4$, from a gaseous effluent of a catalytic cracking catalyst regenerator, a gas produced in the regenerator vessel of a fluid catalytic cracking process unit was scrubbed in a jet ejector type venturi scrubber. The specific venturi scrubber utilized in the test was a 12-inch Koertrol Corporation Model 7010 jet ejector scrubber. This type of scrubber utilizes a large, high pressure (40 to 120 psig) water stream to scrub and compress the gas stream. Sodium hydroxide was used to control the pH of the aqueous scrubbing mixture.

The operating conditions and results of treating 1000 to 3000 actual cubic feet per minutes (ACFM) of a regenerator gaseous effluent are summarized in the following table:

TABLE I

| RUNS | A | B | C | D | E | F | G |
|---|---|---|---|---|---|---|---|
| Inlet Gas Rate, ACFM | 1,830 | 1,480 | 1,410 | 1,040 | 2,050 | 2,230 | 2.720 |
| Inlet Temperature, °F. | 750 | 735 | 700 | 620 | 765 | NA | NA |
| Outlet Temperature, °F. | 110 | 110 | 109 | 105 | 119 | 110 | 117 |
| Delta Head, Inches Water | 1.7 | 1.3 | 2.8 | NA | NA | NA | 2.0 |
| Scrubbing Mixture Rate, gpm | 56 | 55 | 53 | 53 | 52 | 58 | 58 |
| Scrubbing mixture Pressure, psig | 56 | 56 | 52 | 52 | 50 | 90 | 90 |
| Scrubbing mixture to Scrubber, °F. | NA | 92 | 98 | 94 | 104 | 80 | 80 |
| Scrubbing mixture from Scrubber, °F. | 112 | 106 | 110 | 106 | 123 | NA | NA |
| Scrubbing mixture pH | 5.6 | 5.0 | 6.2 | 7.5 | 6.0 | 8.1 | 8.1 |
| Catalyst Loading, Grains/SCF | | | | | | | |
| Inlet | 0.264 | 0.264 | 0.279 | 0.279 | 0.607 | NA | 0.246 |
| Outlet | 0.005 | 0.011 | 0.004 | 0.006 | 0.005 | 0.005 | 0.026 |
| Efficiency | 98.2 | 95.8 | 98.3 | 97.8 | 99.2 | — | 89.3 |
| Condensable Loading, Grains/SCF | | | | | | | |
| Inlet | 0.202 | 0.202 | 0.124 | 0.124 | 0.352 | 0.269 | 0.051 |
| Outlet | 0.018 | 0.025 | 0.013 | 0.010 | 0.007 | 0.004 | 0.003 |
| Efficiency | 91.2 | 87.8 | 89.6 | 92.3 | 98.0 | 98.5 | 94.9 |

Na — Not Available
ACFM — Actual Cubic Feet Per minute
SCF — Standard Cubic Feet
GPM — Gallons Per Minute No attempt was made to determine the $SO_2$ removal efficiency in these runs. In runs C and E, the pH was maintained in the pH range of the present invention.

EXAMPLE 2

In another set of experimental runs, a gas produced in the regenerator vessel of a fluid catalytic cracking process unit was burned in a CO boiler. A stream of the gas emanating from this CO boiler was subsequently scrubbed in a jet ejector type venturi scrubber. The specific venturi scrubber utilized in these runs was a 10-inch Koertrol Corporation Model 7010 jet ejector scrubber. Sodium hydroxide was used to control the pH of the aqueous scrubbing mixture. Since CO boilers operate with back pressure limitation, the ability of the scrubber to compress the low pressure gas eliminates the need for a blower or a fan in the system.

The operating conditions and results are summarized in the following table:

TABLE II

| Runs | H | I | J | K | L | M | N | O | P | Q |
|---|---|---|---|---|---|---|---|---|---|---|
| Gas Rate, ACFM at Scrubber Inlet (10″) | 767 | 810 | 880 | 890 | 897 | 855 | 750 | 753 | 700 | 635 |
| Inlet Temperature at Quench Zone,°F. | 154 | 175 | 177 | 173 | 188 | 171 | 180 | 139 | 140 | 137 |
| Quench Water Rate, GPM | 4.0 | 4.0 | 18.0 | 7.0 | 7.0 | 7.0 | 7.0 | 7.0 | 7.0 | 7.0 |
| Inlet Temperature at Scrubber, °F. | 130 | 137 | 120 | 125 | 130 | 130 | 130.5 | 118 | 116 | 108 |
| Inlet Pressure ″$H_2O$ | −1.8 | −1.4 | −1.9 | −2.0 | −2.0 | −2.0 | −1.6 | −1.5 | −1.5 | −1.4 |
| Scrubbing Mixture Rate, GPM | 53 | 52 | 72 | 75 | 76 | 75 | 36 | 36 | 34 | 32 |
| Scrubbing Mixture Rate, GPM/1000ACF | 69 | 64 | 82 | 84 | 85 | 88 | 48 | 48 | 48 | 50 |
| Separator Outlet Gas Temp., °F. | 127 | 127 | 104 | 108 | 129 | 128 | 130.5 | 119 | 118 | 111 |
| Temperature of Scrubbing Mixture to Scrubber, °F. | 127 | 126 | 100 | 105 | 129 | 128 | 130.5 | 128 | 106 | 106 |
| Temperature of Scrubbing Mixture to Separator Drum, °F. | — | — | 107 | 111 | 130.5 | 130 | 130.5 | 119 | 118 | 109 |
| PH of Scrubbing Mixture to Scrubber | 5.5 | 5.7 | 6.0 | 6.8 | 6.7 | 6.7 | 6.5 | 6.9 | 7.4 | 8.0 |
| Scrubber Nozzle Orifice Size, Inches | 0.59 | 0.59 | 0.8 | 0.8 | 0.8 | 0.8 | 0.49 | 0.49 | 0.49 | 0.49 |
| Pressure of Nozzle, psig | 110 | 110 | 100 | 100 | 100 | 100 | 125 | 125 | 100 | 100 |

TABLE II-continued

| Runs | H | I | J | K | L | M | N | O | P | Q |
|---|---|---|---|---|---|---|---|---|---|---|
| Inlet Sample: | | | | | | | | | | |
| Catalyst Loading, grains/SCF | .0448 | .0693 | .0674 | .0597 | .0624 | .0427 | .0379 | .0512 | .0422 | .0377 |
| Inorganic Condensables, grains/SCF | .0196 | .0135 | .0156 | .0173 | .0181 | .0133 | .0094 | .0151 | .0136 | .0156 |
| Organic Condensables, grains/SCF | .0189 | .0054 | .0053 | .0074 | .0063 | .0059 | .0119 | .0085 | .0051 | .0038 |
| Total particulates, grains/SCF | .0833 | .0882 | .0383 | .0844 | .0368 | .0619 | .0592 | .0748 | .0609 | .0571 |
| SO₂ content, wppm | 465 | 630 | 588 | — | 554 | 560 | 607 | 540 | 360 | 341 |
| Outlet Sample: | | | | | | | | | | |
| Catalyst Loading, grains/SCF | .0039 | .0035 | .0018 | .0024 | .0044 | .0028 | .0021 | .0037 | .0020 | .0043 |
| Inorganic Condensables, grains/SCF | .0080 | .0054 | .0034 | .0024 | .0059 | .0035 | .0041 | .0040 | .0032 | .0028 |
| Organic Condensables, grains/SCF | .0060 | .0022 | .0029 | .0020 | .0023 | .0035 | .0070 | .0055 | .0015 | .0035 |
| Total particulates, grains/SCF | .0179 | .0111 | .0081 | .0063 | .0126 | .0093 | .0132 | .0132 | .0067 | .0106 |
| SO₂ content, wppm | Nil | 4.4 | 2.2 | Nil | Nil | 4.3 | 4.3 | Nil | Nil | Nil |

As can be seen from the data of Table II, runs H and I were conducted at a lower pH and runs P and Q at a higher pH than the pH range of the present invention. Although the data of these short term experimental runs appear to indicate that the process can be carried out over a wide range of pH values, it has been found that for operability of a continued operation such as a commercial scale process, it is necessary to maintain the pH between 6 and 7. At higher pH values, $CO_2$ absorption in the aqueous scrubbing mixture leads to increased consumption of the caustic, as well as to the formation of undesired carbonates. Low pH operations are undesired since they lead to increased rates of corrosion of the equipment.

What is claimed is:

1. A process for removing at least a portion of the sulfur dioxide and cracking catalyst fines, including from about 1 to 40 weight percent particles under one micron in size, from a gaseous effluent containing the same, which comprises:
   a. contacting said gaseous effluent with water to produce a water-saturated gas;
   b. introducing the water-saturated gas containing said particles under one micron in size into a venturi structure and contacting the same with a relatively colder, high velocity stream of an aqueous scrubbing mixture containing a basic material selected from the group consisting of alkali metal hydroxides, ammonium hydroxide, and ammonia, said scrubbing mixture being maintained at a pH in the range varying from about 6 to about 7;
   c. passing the admixture of said gas and scrubbing mixture through a constricted passage of said venturi structure to increase the velocity thereof;
   d. recovering the admixture resulting from step (c) from the venturi structure, and
   e. separating said recovered admixture into a liquid portion and a gaseous portion having a reduced content of cracking catalyst fines and sulfur dioxide.

2. The process of claim 1 wherein the gaseous portion obtained in step (e) is reheated above its dew point.

3. The process of claim 1 wherein said gaseous effluent is a gaseous mixture produced in a regeneration zone of a catalytic cracking process.

4. The process of claim 1 wherein said gaseous effluent is a gaseous mixture produced by burning the effluent of a regeneration zone of a catalytic cracking process in a combustion zone.

5. The process of claim 4, wherein said combustion zone is a CO boiler.

6. The process of claim 1, wherein said gaseous effluent comprises catalyst fines, sulfur dioxide, sulfur trioxide, carbon dioxide, nitrogen and water vapor.

7. The process of claim 1, wherein said basic material is sodium hydroxide.

8. The process of claim 1, wherein additional basic material is introduced into said separated liquid portion.

9. The process of claim 1, wherein a portion of the separated liquid portion is recycled to said gas-scrubbing mixture contacting step (b).

10. The process of claim 9, wherein said separated liquid portion is cooled prior to being recycled to said gas-scrubbing mixture contacting step.

11. The process of claim 1, wherein the admixture recovered from the venturi structure is separated in a separating vessel, said recovered admixture being introduced into said separating vessel above any liquid level present therein.

12. The process of claim 11, wherein additional basic material and water are introduced into said separating vessel.

13. The process of claim 11, wherein additional aqueous scrubbing mixture is introduced into said separating vessel.

14. The process of claim 11, wherein at least a portion of said separated liquid portion is removed from said separating vessel and further treated to remove solids therefrom.

15. The process of claim 1, wherein said high velocity stream of aqueous scrubbing mixture is from about 5° to about 50°F. colder than the temperature of introduction of the water-saturated gas.

16. The process of claim 1, wherein said catalyst fines comprise siliceous material.

17. The process of claim 1, wherein said catalyst fines comprise amorphous or crystalline silica-alumina or mixtures thereof.

18. A process for removing at least a portion of sulfur dioxide and cracking catalyst fines, including from about 1 to 40 weight percent particles under 1 micron in size, from a low pressure gaseous effluent containing the same, which comprises:
   a. contacting said gaseous effluent with water to produce a water-saturated gas;
   b. introducing the water-saturated gas containing said particles under 1 micron in size, into a venturi structure and contacting the same with a relatively colder, high velocity stream of an aqueous scrubbing mixture containing a basic material selected from the group consisting of alkali metal hydroxides, ammonium hydroxide, and ammonia, said scrubbing mixture being maintained at a pH in the range varying from about 6 to about 7;

c. passing the admixture of said gas and scrubbing mixture through a constricted passage of said venturi structure to increase the velocity thereof;

d. recovering said admixture of gas and scrubbing mixture from the venturi structure;

e. separating said recovered admixture of step (d) into a liquid portion and a gaseous portion having a reduced content of cracking catalyst fines and sulfur oxide gases in a separating vessel, said recovered admixture being introduced into said separating vessel above any liquid level present therein, and f. reheating said gaseous portion above its dew point.

19. A process for removing at least a portion of sulfur dioxide and catalyst fines, including from about 1 to 40 weight percent particles under one micron in size, from the gaseous product of a cracking catalyst regenerator containing the same, which comprises:

a. burning said gaseous product in a CO boiler to convert at least a portion of the CO constituent of said gaseous product to $CO_2$;

b. contacting the gaseous effluent of said CO boiler with water to produce a water-saturated gas;

c. introducing the water-saturated gas containing said particles under one micron in size into a venturi structure without any intermediate compression between the CO boiler and the venturi structure and contacting the same with a relatively colder, high velocity stream of an aqueous scrubbing mixture containing a basic material selected from the group consisting of alkali metal hydroxides, ammonium hydroxide, and ammonia, said scrubbing mixture being maintained at a pH in the range varying from about 6 to about 7;

d. passing the admixture of said gas and scrubbing mixture through a constricted passage of said venturi structure to increase the velocity thereof;

e. recovering said admixture of gas and scrubbing mixture from the venturi structure;

f. separating said recovered admixture of step (e) into a liquid portion and a gaseous portion having a reduced content of catalyst fines and sulfur dioxide in a separating vessel, said recovered admixture being introduced into said separating vessel above any liquid level present therein, and g. reheating said gaseous portion above its dew point.

20. The process of claim 19, wherein the pressure drop of said gaseous effluent between its exit pressure from the CO boiler and its outlet pressure from the separating vessel is less than about one foot of water.

21. The process of claim 19, wherein the pressure drop of said gaseous effluent between its exit pressure from the CO boiler and its outlet pressure from the separating vessel is not greater than about two inches of water.

22. A process for removing at least a portion of sulfur dioxide and cracking catalyst, including from about 1 to about 40 weight percent particles under one micron in size, from a gaseous effluent containing the same, which consists essentially of:

a. introducing said gaseous effluent containing said particles under 1 micron in size into a venturi structure and contacting the same with a relatively colder, high velocity stream of an aqueous scrubbing mixture containing a basic material selected from the group consisting of alkali metal hydroxides, ammonium hydroxide, and ammonia, said scrubbing mixture being maintained at a pH in the range varying from about 6 to about 7;

b. passing the admixture of said gas and scrubbing mixture through a constricted passage of said venturi structure to increase the velocity thereof;

c. recovering the admixture resulting from step (b) from the venturi structure, and d. separating said recovered admixture into a liquid portion and a gaseous portion having a reduced content of catalyst fines and sulfur oxide gases.

23. The process of claim 22 wherein said basic material is sodium hydroxide.

24. The process of claim 22 wherein a portion of said separated liquid portion is recycled to said gas-scrubbing mixture contacting step (a).

* * * * *